United States Patent
Podmaniczky et al.

(10) Patent No.: US 8,863,690 B2
(45) Date of Patent: Oct. 21, 2014

(54) FEED-LEVEL CONTROLLED DISPENSER

(71) Applicant: Droll Yankees, Inc., Plainfield, CT (US)

(72) Inventors: Michael Podmaniczky, Wilmington, DE (US); Scott A. Colwell, Dayville, CT (US)

(73) Assignee: Droll Yankees, Inc., Plainfield, CT (US)

( * ) Notice: Subject to any disclaimer, the term of this patent is extended or adjusted under 35 U.S.C. 154(b) by 0 days.

(21) Appl. No.: 13/957,784

(22) Filed: Aug. 2, 2013

(65) Prior Publication Data

US 2014/0041593 A1    Feb. 13, 2014

Related U.S. Application Data

(60) Provisional application No. 61/682,377, filed on Aug. 13, 2012.

(51) Int. Cl.
*A01K 39/01*    (2006.01)

(52) U.S. Cl.
USPC .................. 119/57.8; 119/52.3; 119/57.9

(58) Field of Classification Search
USPC ................ 119/57.8, 57.9, 52.2, 52.3
See application file for complete search history.

(56) References Cited

U.S. PATENT DOCUMENTS

| | | | | |
|---|---|---|---|---|
| 4,646,686 A | * | 3/1987 | Furlani | 119/57.9 |
| RE32,970 E | * | 7/1989 | Furlani | 119/52.3 |
| 5,195,459 A | * | 3/1993 | Ancketill | 119/57.9 |
| 5,285,748 A | * | 2/1994 | Weldin | 119/57.9 |
| 5,289,796 A | * | 3/1994 | Armstrong | 119/52.3 |
| 5,826,540 A | | 10/1998 | Bridges | |
| 5,964,183 A | * | 10/1999 | Czipri | 119/52.3 |
| 6,016,768 A | * | 1/2000 | Colucci | 119/57.9 |
| 6,253,707 B1 | * | 7/2001 | Cote | 119/57.9 |
| 6,561,128 B1 | * | 5/2003 | Carter | 119/57.9 |
| 6,591,781 B2 | | 7/2003 | Hardison | |
| 6,640,746 B1 | * | 11/2003 | Lund | 119/57.9 |
| 6,918,353 B1 | * | 7/2005 | Coroneos | 119/57.1 |
| 7,191,731 B2 | * | 3/2007 | Cote | 119/57.9 |
| 7,198,004 B1 | | 4/2007 | Lush | |
| 7,302,911 B1 | | 12/2007 | Lush | |
| 7,418,923 B1 | * | 9/2008 | Banyas et al. | 119/57.9 |
| 7,739,982 B2 | * | 6/2010 | Cote | 119/57.9 |
| 7,798,099 B2 | * | 9/2010 | Vosbikian | 119/52.3 |
| 7,992,520 B2 | | 8/2011 | Lush | |
| 8,006,642 B2 | * | 8/2011 | Vosbikian | 119/52.2 |
| 8,434,425 B2 | * | 5/2013 | Cote | 119/57.9 |

OTHER PUBLICATIONS

Duncraft, Evenseed Squirrel Dilemma, http://www.duncraft.com/Evenseed-Squirrel-Dilemma, website visited Apr. 12, 2012, p. 1 of 1, USA.

* cited by examiner

*Primary Examiner* — Yvonne Abbott
(74) *Attorney, Agent, or Firm* — Dingman, McInnes & McLane, LLP (57) ABSTRACT

A feed dispenser includes a housing and a piston assembly. The piston assembly includes a piston disposed within the housing, the piston and the housing configured to translate relative to each other, and a sheath. The sheath extends about the piston and spring and defines a feed volume with the housing. The feed volume configured to receive feed from a housing chamber of the housing in response to the relative translation of the piston and the housing.

19 Claims, 6 Drawing Sheets

FEED-LEVEL CONTROLLED DISPENSER

This patent application claims the benefit of U.S. Provisional Application No. 61/682,377, filed on Aug. 13, 2012, entitled, "Feed-Level Controlled Dispenser," the contents and teachings of which are hereby incorporated by reference in their entirety.

BACKGROUND

Bird feeders are typically configured to allow birds to freely access bird seed, such as sunflower seeds or other seed blends or mixes, contained by the feeders. For example, a typical bird feeder includes a feeder compartment which houses the seed and makes the seed available to birds through an opening or port formed within the feeder compartment. Once filled with bird seed, the bird seed feeder can be hung from a support for ease of access by one or more birds.

SUMMARY

Conventional bird feeders can suffer from a variety of deficiencies. For example, as birds eat the seed from the bird feeder, the seed level drops from the top of the feeder to the bottom of the feeder over time. In order to maintain a constant feed supply at all feeding ports, the owner must refill the feeder on a substantially regular basis. The relatively frequent topping-off required by conventional bird feeders to keep all feeding ports active can inconvenience the owner. Additionally, conventional bird feeders are positioned at elevated locations above the ground. In order to refill the bird feeder, the owner typically utilizes a climbing device, such as a step stool or ladder, to access the feeder for filling with bird seed. Accordingly, refilling of the bird feeder can expose the owner to an increased risk of accidental injury.

By contrast to conventional bird feeders, embodiments of the present innovation relate to a feed-level controlled dispenser. A feed dispenser includes a housing and a piston assembly having a piston and a sheath disposed within the housing. The piston assembly and the housing are configured to move relative to each other. The sheath is disposed between the piston and an inner wall of the housing and defines an annular volume or feed volume relative to the inner wall of the housing. In use, as birds eat the feed from the dispenser, the reduction of the volume of feed within the housing causes the housing and piston assembly to move relative to each other to force the feed from a substantially central housing chamber and into the feed volume. By positioning the feed into the feed volume, the housing and piston assembly distribute the seed toward ports formed in the wall of the housing to maintain the bird feeder in a topped-off state for a relatively long duration of time and to minimize the need for frequent refilling.

In one arrangement, a feed dispenser includes a housing and a piston assembly disposed within the housing. The piston assembly includes a piston, the piston and the housing configured to translate relative to each other and a sheath disposed between the piston and an inner wall of the housing, the sheath defining a feed volume with the housing. The feed volume is configured to receive feed from a housing chamber of the housing in response to the relative translation of the piston and the housing.

In one arrangement, to distribute feed to the feed volume, the piston is configured to translate along a longitudinal axis relative to the housing. For example, the feed dispenser includes a spring-loaded piston assembly disposed within the housing. In operation, a user compresses a spring of the piston assembly by pulling a central shaft or chain associated with a piston of the piston assembly towards a housing base. The piston can lock to the housing via a locking mechanism to secure the spring in a compressed state. In such an arrangement, a user can fill the feeder with bird seed and, once filled, can release the locking mechanism to release the piston assembly. As the seed is consumed, the spring expands and causes the piston to push the seed from the bottom toward the top of the housing. Additionally, as the piston assembly pushes the seed toward the top of the housing, the seed cascades from the top of the housing into a volume located between the piston assembly and the inner wall of the housing, as defined by the sheath. With such a configuration, the piston assembly distributes the seed toward ports formed in the wall of the housing to maintain the bird feeder in a topped-off state for a relatively long duration of time and to minimize the need for frequent refilling.

In another arrangement, to distribute feed to the feed volume, the housing is configured to translate moves relative to the piston. For example, a feed dispenser includes a housing configured to translate along a longitudinal axis of the housing between a first position and a second position and a piston assembly having a piston disposed within the housing and a sheath extending about the piston. The sheath defines a feed volume with the housing, the feed volume being configured to receive feed from a housing chamber of the housing in response to the housing moving between the first position and the second position relative to the piston.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a feed-level controlled dispenser. A feed dispenser includes a housing and a piston assembly having a piston and a sheath disposed within the housing. The piston assembly and the housing are configured to move relative to each other. The sheath is disposed between the piston and an inner wall of the housing and a feed volume relative to the inner wall of the housing. In use, as birds eat the feed from the dispenser, the reduction of the volume of feed within the housing causes the housing and piston assembly to move relative to each other to force the feed from a substantially central housing chamber defined by the feed dispenser and into the feed volume. By positioning the feed into the feed volume, the housing and piston assembly distribute the seed toward ports formed in the wall of the housing to maintain the bird feeder in a topped-off state for a relatively long duration of time and to minimize the need for frequent refilling.

Figure 1:
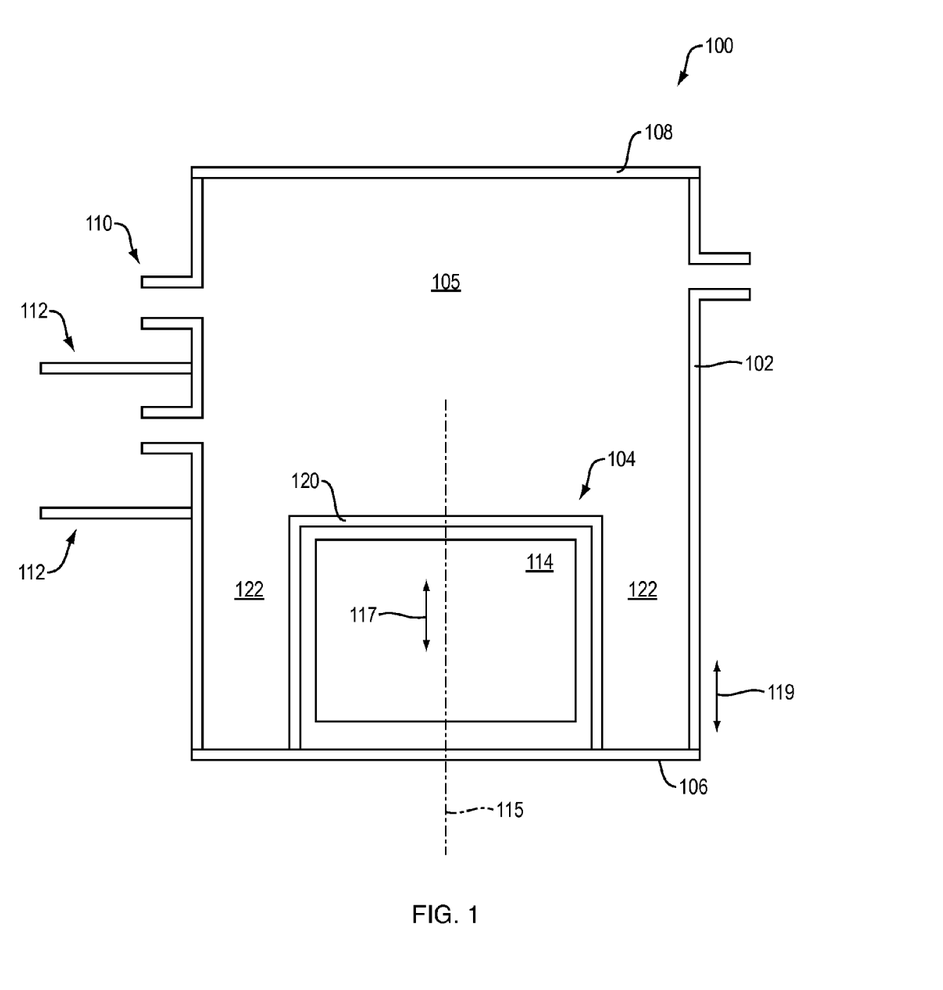
FIG. 1 illustrates a sectional view of a feed dispenser, according to one arrangement.

FIG. 1 illustrates a sectional view of an example of a feed dispenser 100, such as used to dispense bird seed or other feed. The feed dispenser 100 includes a housing 102 and a piston assembly 104 disposed within the housing 102. The piston assembly 104 includes a piston 114 and a sheath 120 disposed between the piston 114 and an inner wall of the housing 102.

The housing 102 includes a base 106 and an opposing cover 108 and defines a set of ports 110 there between. The ports 110 are configured to provide access to the feed contained within a housing chamber 105 of the feed dispenser 100. In one arrangement, the housing 102 includes a set of perches 112 mounted to the housing 108 in proximity to a corresponding port 110 to allow birds to sit on the feed dispenser 100 and access the feed contained by the housing 102. While the housing 102 can be manufactured from a variety of materials, in one arrangement, the housing 102 is manufactured from a transparent material, such as a transparent plastic material. As will be described in detail, the transparency of the housing 102 allows a user to visually determine when the amount of feed contained within the feed dispenser 100 falls below a threshold level.

The housing 102 and the piston 114 are configured to translate along a longitudinal axis 115 of the feed dispenser 100 relative to each other. With such a configuration, relative motion between the housing 102 and the piston 114 distributes feed contained within the housing chamber 105 defined by the feed dispenser 100 toward the ports 110 to maintain the feed dispenser 100 in a substantially topped-off (i.e., full) state for a relatively long duration of time. As will be described below, in one arrangement, the piston 114 is configured to translate 117 along the longitudinal axis 115 relative to the housing 102, such as when the housing 102 is held in a relatively stationary position. In another arrangement, the housing 102 is configured to translate 119 along the longitudinal axis 115 relative to the piston 114, such as when the piston 114 is held in a relatively stationary position.

The sheath 120 defines a feed volume 122 relative to the inner wall of the housing 102, the feed volume 122 being configured to receive feed from the housing chamber as the housing 100 and the piston 114 moves relative to each other, such as between a compressed and an expanded position relative to the base 106. For example, the sheath 120 and the inner wall of the housing 102 define an annular volume or channel (i.e., the feed volume) 122 there between. As will be described below, with such a configuration and in use, as the housing 102 and the piston assembly 104 translate relative to each other, the piston assembly 104 advances feed within the housing chamber 105 toward the feed volume 122. Because the ports 110 are disposed in proximity to the feed volume 122, as indicated in FIG. 1, during operation, the feed dispenser 100 provides birds or other animals with accessibility to the feed for a relatively long duration of time.

Figure 2:
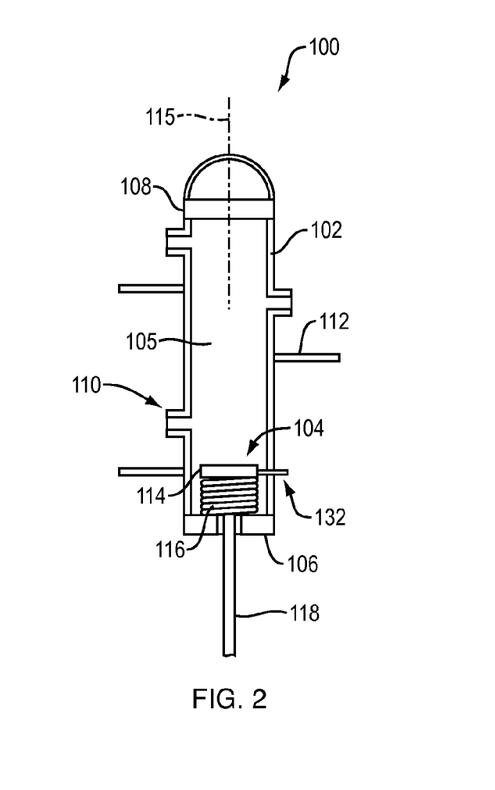
FIG. 2 illustrates a sectional view of a feed dispenser having a piston assembly configured to translate relative to a housing, a portion of a piston assembly being disposed in a compressed position, according to one arrangement.
Figure 3:
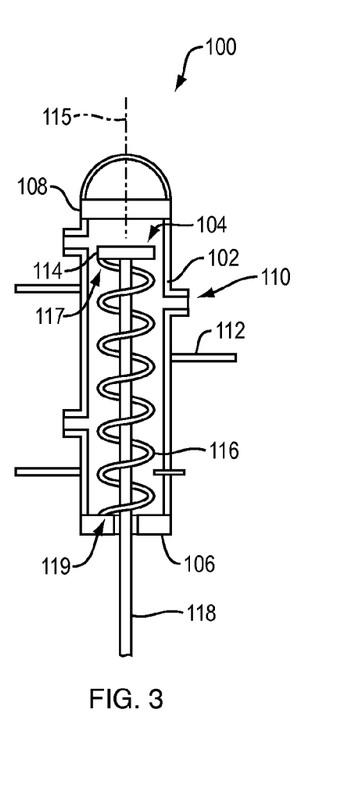
FIG. 3 illustrates a sectional view of the feed dispenser of FIG. 2 having the portion of the piston assembly disposed in an expanded position.
Figure 4:
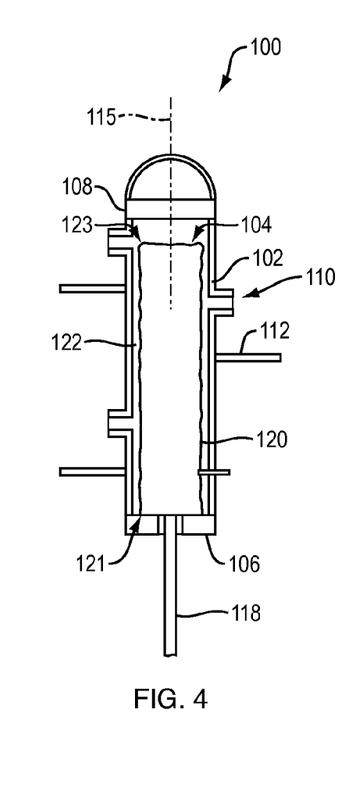
FIG. 4 illustrates a sectional view of the feed dispenser of FIG. 2 having a sheath forming part of the piston assembly.

As indicated above, in one arrangement, the piston 114 is configured to translate along the longitudinal axis 115 relative to the housing 102. FIGS. 2-4 illustrate an example of the feed dispenser 100 in such an arrangement.

The piston assembly 104 is configured to distribute feed contained by the feed dispenser 100 toward the feed volume 122 and to maintain the feed dispenser 100 in a substantially full state. For example, the piston assembly 104 includes the piston 114, such as a platform disposed within the housing 102, a spring 116 disposed between the base 106 and the piston 114, and the sheath 120 extending about the piston 114 and the spring 116.

As shown in FIG. 3, the spring 116 includes a first end 117 coupled to the piston 114 and a second end 119 coupled to the base 106. The spring 116 is configured to move the piston 114 between a first position and a second position relative to the base 106 to move the feed contained in the housing chamber 105 toward the ports 110. For example, the spring 116 is configured as a compression spring that can move between a first, compressed position as shown in FIG. 2 and a second, expanded position as shown in FIG. 3. During operation, as will be described in detail below, as birds access the ports 110 to remove the feed from the feed dispenser 100 over time, the feed contained in the housing chamber 105 exerts a reduced amount of force on the piston 114 and spring 116. In response, the spring 116 moves from the compressed position (FIG. 2) to the expanded position (FIG. 3) to push the feed from the bottom of the housing 102, toward the feed volume 122, and toward the ports 110.

The sheath 120, as illustrated in FIG. 4 is configured to cover the spring 116 and piston 114 to minimize feed from engaging the spring coils and interfering with the operation of the spring 116. While the sheath 120 can be made from a variety of materials, in one arrangement, the sheath 120 is manufactured from a compliant material such as a fabric, plastic, or rubber material. Accordingly, the sheath 120 allows the spring 116 and piston 114 to translate within the housing 102 and along a longitudinal axis 115 in a substantially smooth manner.

In one arrangement, as indicated in FIG. 4, the sheath 120 includes a first end 121 secured to the base 106 and a second end 123 secured to the piston 114 and is configured to move between a compressed position and an extended position as the piston assembly 104 moves between the compressed extended positions. For example, the sheath 120 is configured to expand along the longitudinal axis 115 as the spring 116 moves from a compressed position (FIG. 2) to an expanded position (FIG. 3). Additionally, the sheath 120 is configured to become compressed along the longitudinal axis 115 as the spring 116 moves from the expanded position (FIG. 3) to the compressed position (FIG. 2).

As indicated above, the sheath 120 defines the feed volume 122 relative to the inner wall of the housing 102, the feed volume 122 being configured to contain feed as the piston 114 moves between the compressed and the expanded position relative to the base 106. For example, the sheath 120 and the inner wall of the housing 102 define an annular volume or channel (i.e., the feed volume) 122 there between. As will be described below, with such a configuration, as the piston assembly 104 advances feed within the housing chamber 105 from the base 106 to the cover 108, a portion of the feed enters the feed volume 122. Because the ports 110 are disposed in proximity to the feed volume 122, as indicated in FIG. 4, during operation the feed dispenser 100 provides accessibility to the feed for a relatively long duration of time.

Figure 5:
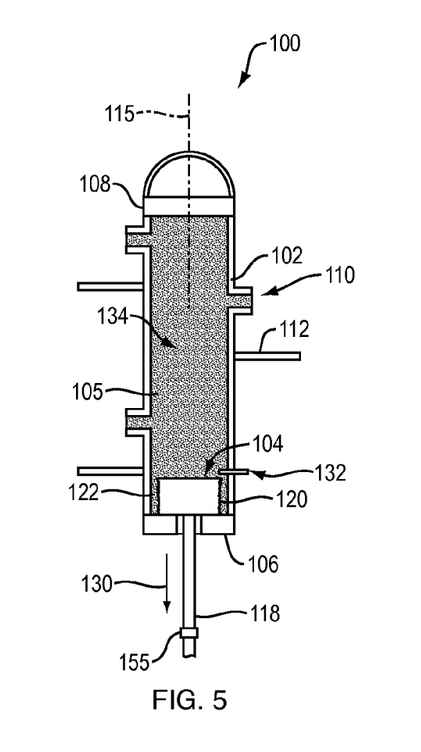
FIG. 5 illustrates a sectional view of the feed dispenser of FIG. 4, according to one arrangement.
Figure 6:
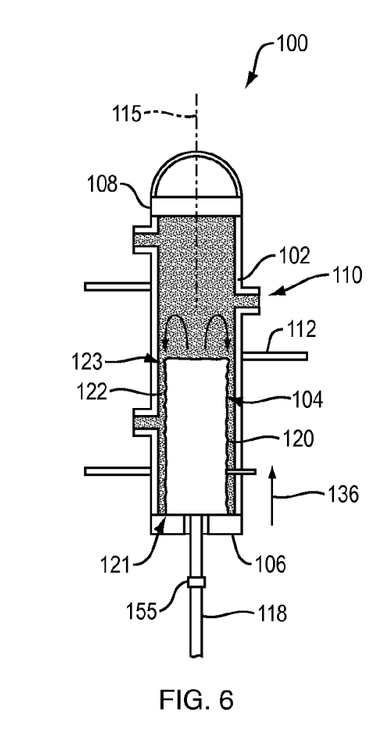
FIG. 6 illustrates a sectional view of the feed dispenser of FIG. 5 having the piston assembly advancing feed within the dispenser.
Figure 7:
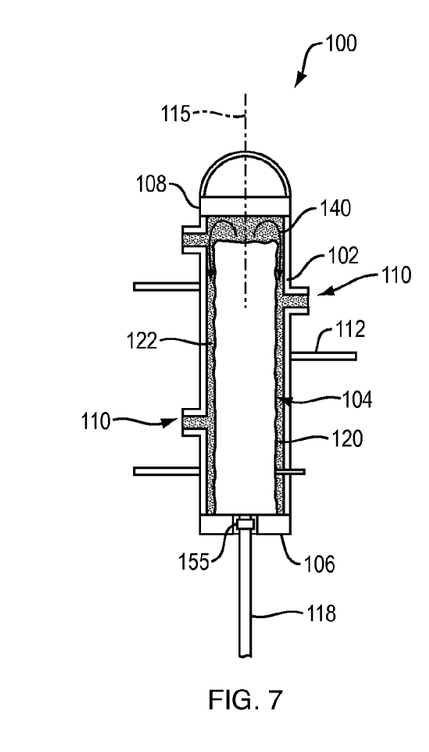
FIG. 7 illustrates a sectional view of the feed dispenser of FIG. 5 having the piston assembly fully advanced within the dispenser.

FIGS. 5-7 illustrate operation of the feed dispenser 100 over time, according to one arrangement. Initially, to load the feed dispenser 100 with feed, such as bird seed, a user compresses the piston assembly 104 within the housing 102 to define the housing chamber 105 to receive the feed 134. For example, with reference to FIG. 5, the piston 114 includes a positioning element 118 extending from the base 106 of the housing 102. Using the positioning element 118, the user applies a load to the piston assembly 104 along direction 130. When the piston assembly 104 reaches a compressed state, the piston assembly 104 engages a locking mechanism 132 to secure the piston 114 to the housing 102. For example, the locking mechanism 132 can be configured as a rod that engages an indentation defined by the piston 114. In another example, the locking mechanism 132 can be configured as a clamp, such as a collar having a set screw. The collar can be disposed about the outer circumference of the housing 102 while the set screw can be configured to selectively couple to the piston 114. In another example, the locking mechanism 132 can be configured as a cleat disposed on the base 106 of the feed dispenser 100. In the case where the positioning element 118 is configured as a chain, the chain can be selectively coupled to the cleat to either lock or unlock the piston 114 relative to the housing 102.

With the piston assembly 104 secured to the housing 102, the user can remove the cover 108 from the housing 102 and fill the chamber 105 of the housing with feed 134, such as bird seed. The user can then replace the cover 108 and disengage the locking mechanism 132. With the locking mechanism 132 disengaged, the spring 116 generates a force along direction 136 (FIG. 6) to bias the piston 114 for translation within the chamber 105 along longitudinal axis 115.

With reference to FIG. 6, as birds eat the feed 134 from the feed dispenser 100 over time, the load generated by the feed on the piston assembly 104 decreases. Accordingly, as the load decreases, the spring 116 expands from a compressed to an extended position to force the piston 114 to advance the feed 134 toward the cover 108 of the housing 102. As the feed 134 advances within the chamber 105, a portion of the feed 134 cascades 140 into the feed volume 122 defined between the sheath 104 and the inner wall of the housing 102. The piston assembly 104 provides feed 134 to each of the ports 110 as feed 134 is removed from the feed dispenser to maintain the bird feeder 100 in a topped-off state for a relatively long duration of time. Accordingly, the piston assembly 104 minimizes the need for frequent refilling.

Figure 8:
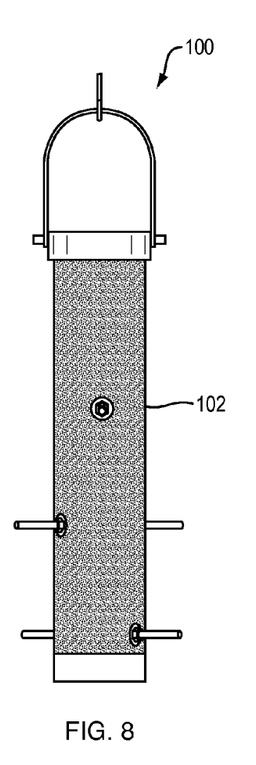
FIG. 8 illustrates a side view of the feed dispenser of FIG. 2, according to one arrangement.
Figure 9:
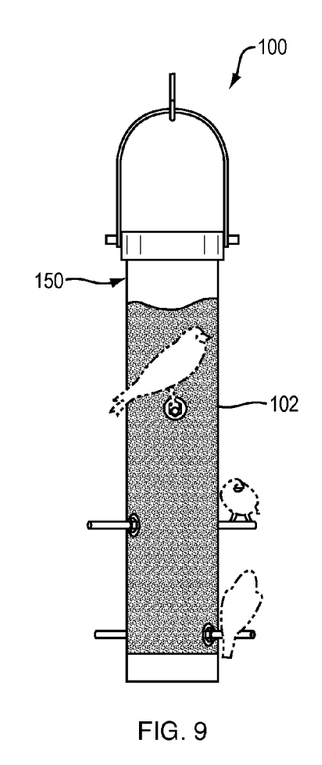
FIG. 9 illustrates a side view of the feed dispenser of FIG. 2, according to one arrangement.

In one arrangement, the feed dispenser 100 is configured to provide a user with visual notification regarding the need to refill the feed dispenser 100. For example, as indicated in FIG. 8, during operation as the piston assembly 104 directs the feed toward the ports 110, the transparent housing 102 indicates the feed dispenser 100 as being full. However, in the case where the piston assembly 104 reaches a maximally extended position, further removal of the feed 134 from the feed dispenser 100 creates a space 150 between the piston 114 and the cover 108, as indicated in FIG. 9. The presence of the space 150 indicates to the user that the overall feed volume contained by the housing is below a given threshold and that the feed dispenser 100 should be refilled. In another example, with reference to FIGS. 5-7, the positioning element 118 includes a marker 155 that travels with the positioning element 118 along direction 136 as seed 134 is removed from the feed dispenser 100. Over time, as the piston assembly 114 reaches a maximally extended position, as shown in FIG. 7, the marker 155 moves into the housing 102 and is no longer visible to a user. Disappearance of the marker 155 from a user's view in this manner indicates to the user that the overall feed volume contained by the housing is below a given threshold and that the feed dispenser 100 should be refilled.

Figure 10:
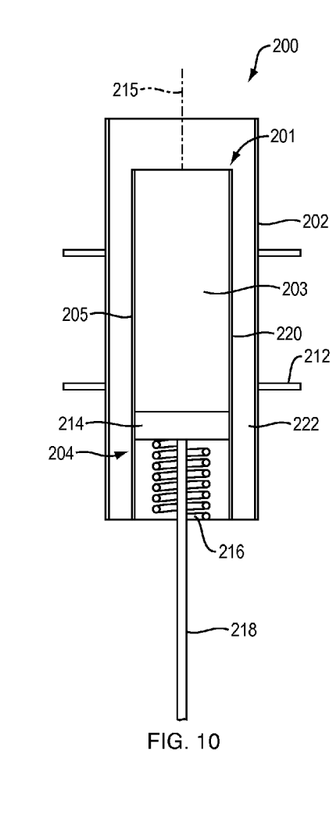
FIG. 10 illustrates a sectional view of a feed dispenser having a centering mechanism and a piston assembly disposed in a compressed position, according to one arrangement.
Figure 11:
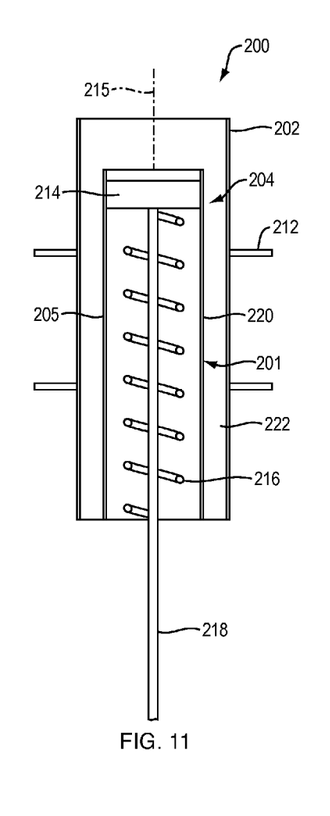
FIG. 11 illustrates a sectional view of the feed dispenser of FIG. 10 having the piston assembly disposed in an expanded position.

In one arrangement, the feed dispenser includes a centering mechanism configured to maintain the piston assembly substantially within the center of the housing chamber and to minimize twisting or jamming of the spring during operation. While the centering mechanism can be configured in a variety of ways, one arrangement of a feed dispenser 200 having a centering mechanism 201 is illustrated in FIGS. 10 and 11.

As shown, the centering mechanism 201 is configured an inner housing portion 205, such as a cylindrical tube disposed within a housing 202, that defines a chamber 203. The centering mechanism 201 is configured to substantially align a longitudinal axis of a spring 216 with a longitudinal axis of the housing 202. The piston 214 and spring 216 are disposed within the chamber 203 such that the inner housing portion 205 substantially constrains lateral movement of the piston 214 and the spring 216 as the piston 214 translates along longitudinal axis 215 from a compressed position (FIG. 10) to an expanded position (FIG. 11).

In one arrangement, the centering mechanism 201 is also configured as a sheath 220 which minimizes feed from engaging the coils of the spring 216 and interfering with the operation of the spring 216 and which defines a feed volume 222 relative to an inner wall of the housing 202. During operation, when the spring 216 is compressed, as illustrated in FIG. 10, a user can fill the housing 202, including chamber 203, with feed. During operation, as the spring 216 moves to the fully extended position as illustrated in FIG. 11, the piston 214 and spring 216 pushes the feed contained within the inner tube 203 to the top of the housing where it overflows into the annular feed volume 222 to provide the feed to the ports (not shown).

Figure 12:
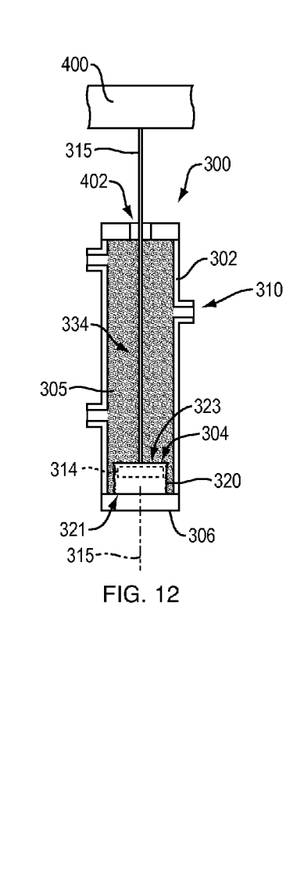
FIG. 12 illustrates a sectional view of a feed dispenser having a housing configured to translate relative to a piston assembly, the housing disposed in an expanded state relative to the piston, according to one arrangement.
Figure 13:
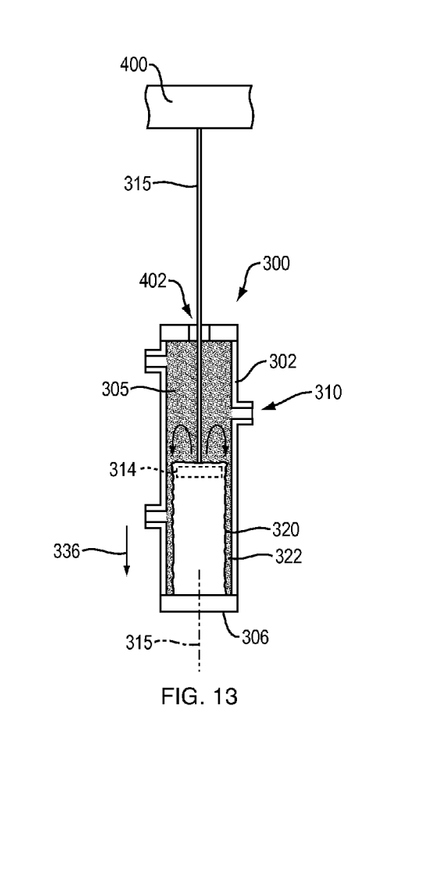
FIG. 13 illustrates the feed dispenser of FIG. 12 having the housing disposed in a partially collapsed state relative to the piston.
Figure 14:
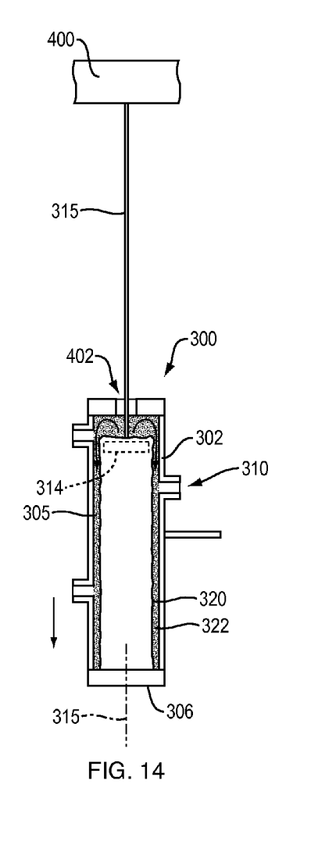
FIG. 14 illustrates the feed dispenser of FIG. 12 having the housing disposed in a substantially fully collapsed state relative to the piston.

As indicated above, in one arrangement, the housing of the feed dispenser is configured to translate along a longitudinal axis relative to the piston to distribute feed to a feed volume. FIGS. 12-14 illustrate an example of the feed dispenser 300 configured in such an arrangement.

As illustrated, the feed dispenser 300 includes a piston assembly 304 having a piston 314, a sheath 320, and a mounting support 315 coupled to the piston assembly 304 and extending through an opening 402 in the cover 308 of the housing 302. The sheath includes a first end 321 secured to the base 306 of the housing 302 and a second end 323 secured to the piston 314. The mounting support 315 of the piston assembly 304 is configured to be secured to a solid object or surface 400. In use, with a position of the piston 314 substantially fixed relative to the support 400, the housing 302 is configured to translate along a longitudinal axis 315 between a first position and a second position relative to the piston 314.

For example, as illustrated in FIG. 12, a user fills the feed dispenser 300 with feed 334 and secures the dispenser to the surface 400 via mounting support 315. In such a configuration, the weight to the housing 302 exerts a load on the volume of feed 334 contained within the housing 302. As the feed 334 is removed from the feed dispenser, the volume of feed 334 within the dispenser 300 decreases and the weight of the housing 302 causes the housing 302 to translate along direction 336 relative to the piston 314, as illustrated in FIG. 13. With such translation, the housing 302 causes the sheath 302 to expand relative to the base 306 and to force seed from the housing chamber 305 to the annular feed volume 322. Further removal of the feed 334 causes additional translation of the housing 302 relative to the piston 314 and expansion of the sheath 320, as shown in FIG. 14. Because the ports 310 are disposed in proximity to the feed volume 322, as indicated in FIG. 14, during operation, the feed dispenser 300 provides birds or other animals with accessibility to the feed for a relatively long duration of time.

While various embodiments of the innovation have been particularly shown and described, it will be understood by those skilled in the art that various changes in form and details may be made therein without departing from the spirit and scope of the innovation as defined by the appended claims.

What is claimed is:

1. A feed dispenser, comprising:
  a housing; and
  a piston assembly disposed within the housing, the piston assembly having:
    a piston, the piston and the housing configured to translate relative to each other, and
    a sheath disposed between the piston and an inner wall of the housing, the sheath defining a feed volume with the housing, the feed volume configured to receive feed from a housing chamber of the housing in response to the relative translation of the piston and the housing.

2. The feed dispenser of claim 1, wherein the piston is configured to translate along a longitudinal axis between a first position and a second position relative to a base of the housing.

3. The feed dispenser of claim 2, wherein the piston assembly comprises a spring disposed between the base of the housing and the piston, the spring configured to position the piston between the first position and the second position relative to the base of the housing, the sheath configured to extend about the piston and spring.

4. The feed dispenser of claim 3, wherein the sheath comprises a first end secured to the base and a second end secured to the piston, the sheath configured to move between a compressed position and an extended position as the piston moves between the first position and the second position.

5. The feed dispenser of claim 3, wherein the sheath is configured as a centering mechanism to substantially align a longitudinal axis of the spring with a longitudinal axis of the housing.

6. The feed dispenser of claim 5, wherein the centering mechanism comprises an inner housing portion defining a chamber, the piston and spring disposed within the chamber, the chamber configured to substantially constrain lateral movement of the piston and the spring as the piston translates between the first position and the second position along the longitudinal axis.

7. The feed dispenser of claim 2, comprising a locking mechanism coupled to the housing, the locking mechanism configured to move between a first position to secure the piston assembly in a compressed state relative to the base and a second position to release the piston assembly and allow the piston assembly to extend relative to the base.

8. The feed dispenser of claim 2, comprising a centering mechanism configured to substantially align a longitudinal axis of the spring with a longitudinal axis of the housing.

9. The feed dispenser of claim 1, wherein the housing is configured to translate along the longitudinal axis of the housing between a first position and a second position relative to the piston.

10. The feed dispenser of claim 9, wherein the sheath comprises a first end secured to a base of the housing and a second end secured to the piston, the sheath configured to move between an extended position and a compressed position as the housing moves between the first position and the second position.

11. The feed dispenser of claim 1, wherein the housing defines a set of feed ports in communication with at least one of the housing chamber and the feed volume.

12. A feed dispenser, comprising:
  a housing; and
  a piston assembly having:
    a piston disposed within the housing,
    a spring disposed between a base of the housing and the piston, the spring configured to position the piston along a longitudinal axis between a first position and a second position relative to the base, and
    a sheath extending about the piston and spring, the sheath defining a feed volume with the housing, the feed volume configured to receive feed from a housing chamber of the housing in response to the piston moving between the first position and the second position.

13. The feed dispenser of claim 12, wherein the sheath comprises a first end secured to the base and a second end secured to the piston, the sheath configured to move between a compressed position and an extended position as the piston assembly moves between the first position and the second position.

14. The feed dispenser of claim 12, wherein the sheath is configured as a centering mechanism to substantially align a longitudinal axis of the spring with a longitudinal axis of the housing.

15. The feed dispenser of claim 14, wherein the centering mechanism comprises an inner housing portion defining a chamber, the piston and spring disposed within the chamber, the chamber configured to substantially constrain lateral movement of the piston and the spring as the piston translates between the first position and the second position.

16. The feed dispenser of claim 12, comprising a locking mechanism couple to the housing, the locking mechanism configured to move between a first position to secure the piston assembly in a compressed state relative to the base and a second position to release the piston assembly and allow the piston assembly to extend relative to the base.

17. The feed dispenser of claim 12, comprising a centering mechanism coupled to the piston assembly, the centering mechanism configured to substantially align a longitudinal axis of the spring with a longitudinal axis of the housing.

18. A feed dispenser, comprising:
  a housing configured to translate along a longitudinal axis of the housing between a first position and a second position; and
  a piston assembly having:
    a piston disposed within the housing, and
    a sheath extending about the piston, the sheath defining a feed volume with the housing, the feed volume configured to receive feed from a housing chamber of the housing in response to the housing moving between the first position and the second position relative to the piston.

19. The feed dispenser of claim 18, wherein the sheath comprises a first end secured to a base of the housing and a second end secured to the piston, the sheath configured to move between an extended position and a compressed position as the housing moves between the first position and the second position.

* * * * *